March 13, 1951　　　B. J. BASKERVILLE　　　2,545,188
HAY BALER FEED MECHANISM
Filed Dec. 21, 1945　　　　　　　　　　　4 Sheets-Sheet 1

INVENTOR.
Benjamin J. Baskerville
BY
Charles K. Woodin
Agent.

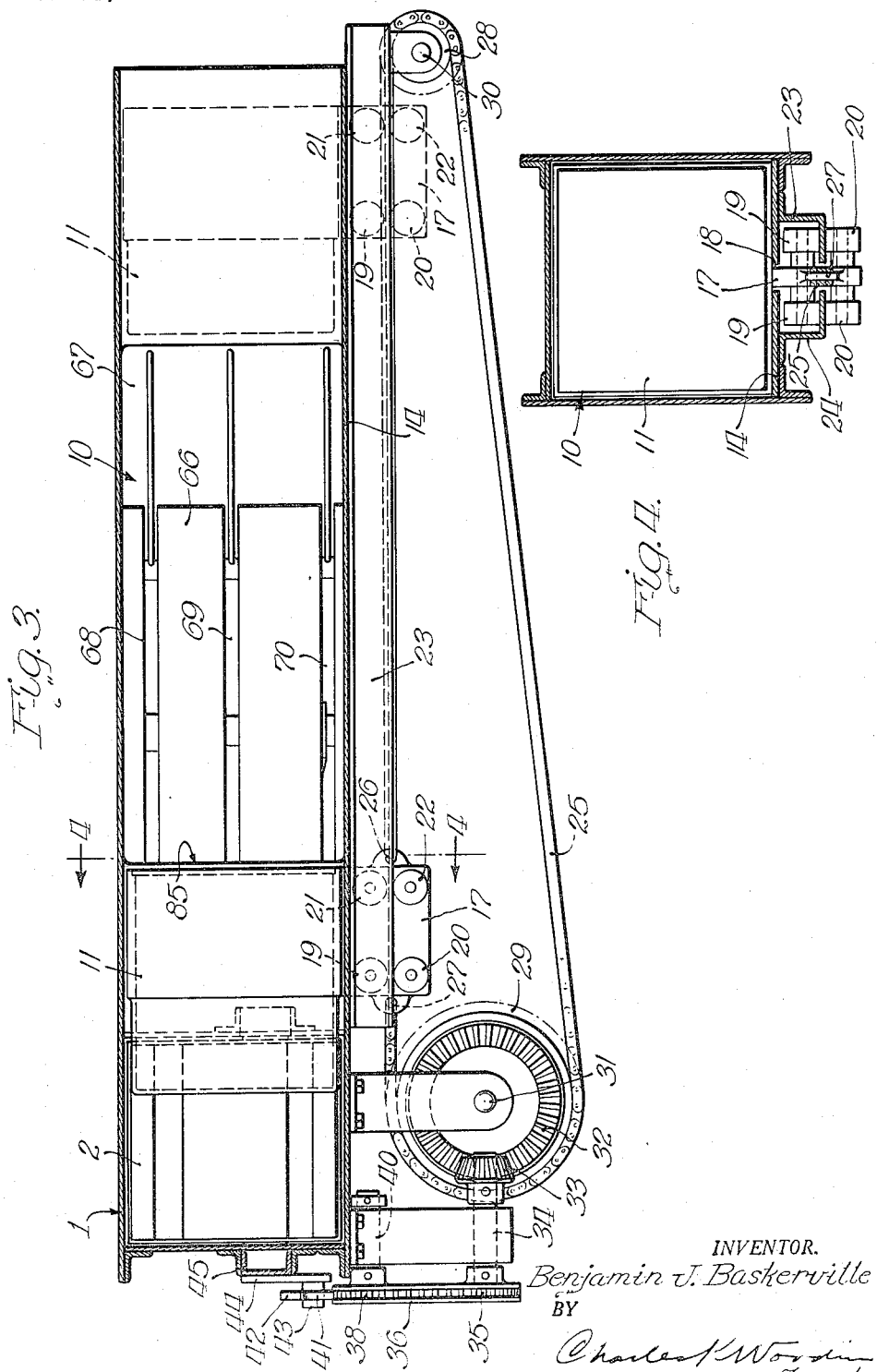

March 13, 1951 B. J. BASKERVILLE 2,545,188
HAY BALER FEED MECHANISM
Filed Dec. 21, 1945 4 Sheets-Sheet 4
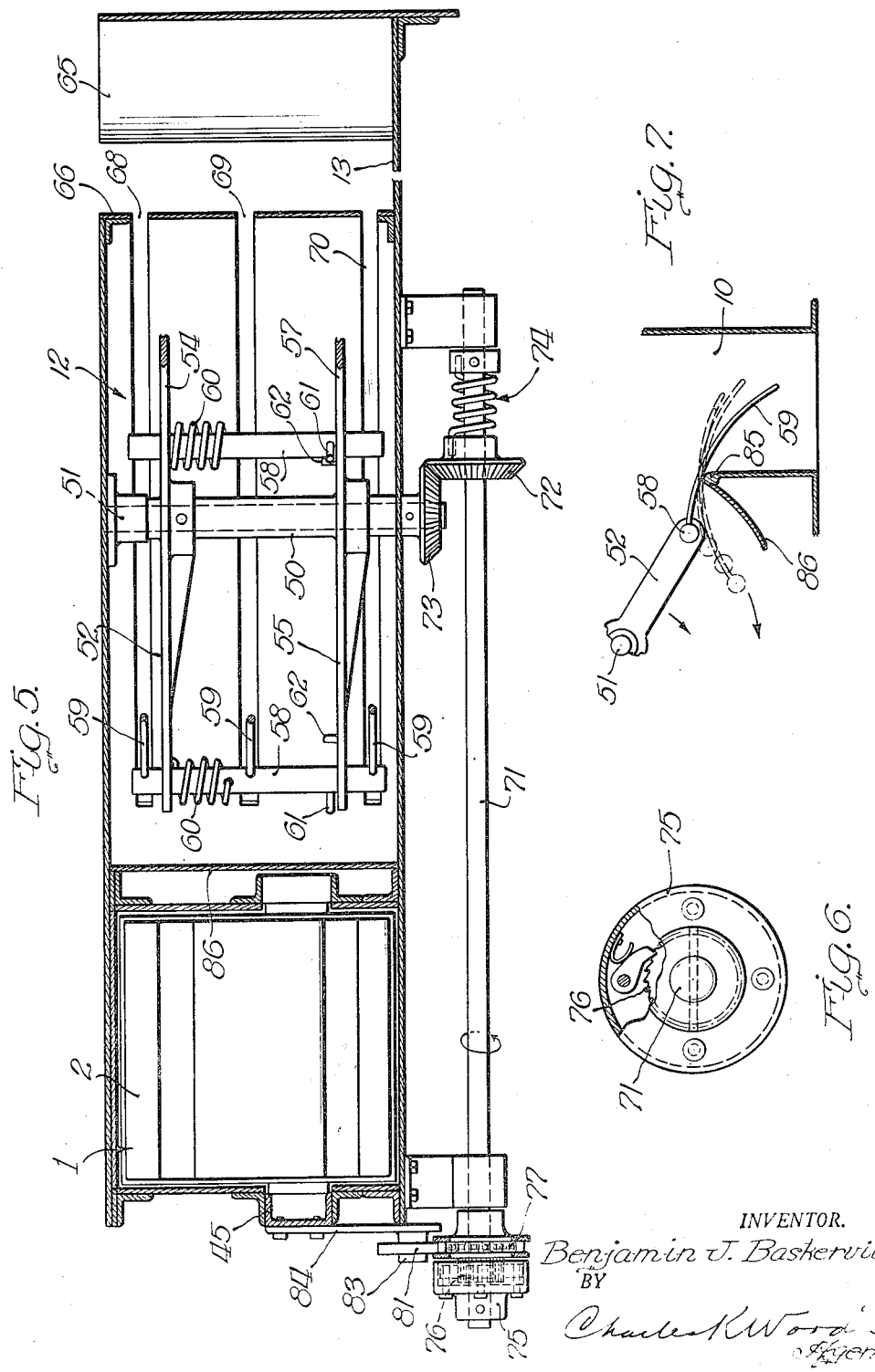
INVENTOR.
Benjamin J. Baskerville
BY
Charles K Wood
Agent.

Patented Mar. 13, 1951

2,545,188

UNITED STATES PATENT OFFICE 2,545,188

HAY BALER FEED MECHANISM

Benjamin J. Baskerville, Joliet, Ill.; Margaret K. Baskerville, Raymond A. Baskerville, Marie A. Baskerville, Frances A. Baskerville Lennon, and Walter J. Baskerville, heirs of said Benjamin J. Baskerville, deceased, assignors to Frances A. Lennon, Maywood, individually and as trustee for Marie A. Baskerville, Joliet, Walter J. Baskerville, Manhattan, and Raymond A. Baskerville, Symerton, Ill.

Application December 21, 1945, Serial No. 636,541

5 Claims. (Cl. 100—25)

1

The present invention relates to hay balers and is more specifically directed to feed mechanism associated with the main baling chamber of the press for the purposes of supplying materials to said press chamber to be acted upon by the main plunger of the press. The structure herein disclosed and described embodies certain improvements and advantageous features which may be incorporated into a baler of the type shown and described in my copending application, Serial No. 531,071, filed April 14, 1944.

It is one of the main objects of the present invention to simplify the supplying of baling material to the compression chamber of the baler which has heretofore been accomplished with awkward and cumbersome mechanical devices or which has been manually accomplished necessitating the use of men who could be otherwise occupied for more urgent farm work.

Another object of the present invention is to provide a feed mechanism comprising one or more mechanically actuated units which are all driven directly by suitably arranged actuating mechanism driven from the main plunger that operates within the compression chamber of the baler.

It is still a further object of the present invention to provide a material-supplying platform which is fed with materials to be baled that are picked up directly off of the ground by a conventional pick-up mechanism that can be continuously operated while the entire hay baler is moving along the ground, such pick-up means supplying the feeding units with hay or the like, making the entire operation of the baler fully automatic and highly efficient and with minimum manual attendance.

Another object of the invention is to provide feed means which accelerates the baling operation thereby considerably reducing the time necessary for baling the materials to be baled by the introduction of the novel feed means for supplying relatively large volume material introduction supplied under an initial compression and packing the main chamber of the press to be subsequently acted upon by the main compression plunger of the baler.

All other objects and advantages embodied in the baler of the present construction will hereinafter appear in the following detailed description having reference to the drawings forming a part of this specification.

In the drawings:

Fig. 3 is a transverse vertical cross sectional view through the plunger feed mechanism and auxiliary feed chamber as viewed substantially along the line 3—3 in Fig. 1;

Fig. 4 is a detailed cross sectional view through the feed chamber as taken along the line 4—4 in Fig. 3;

Fig. 5 is another transverse vertical cross sectional view through the baler and the feed mechanism substantially as viewed along the line 5—5 in Fig. 1;

Fig. 6 is a face view of the ratchet means employed in the drive of one of the actuating means, this ratchet means being interposed in the fork driving means; and Fig. 7 is a small detailed view diagrammatically illustrating the manner in which the tines of the feed fork are retracted out of the auxiliary chamber of the feed plunger operating mechanism.

Figure 1:
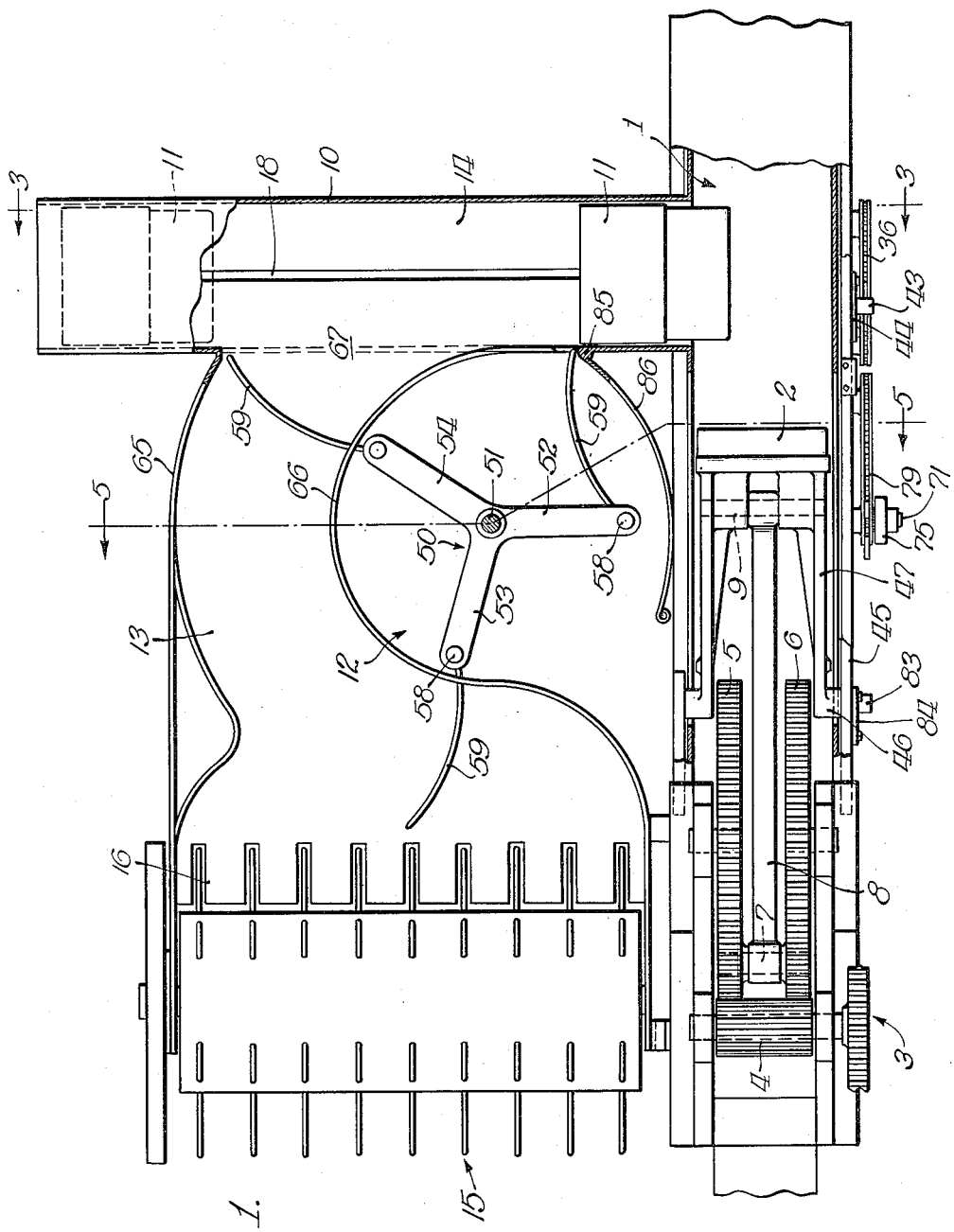
Fig. 1 is a general plan view of the baler incorporating the feed mechanism for supplying the main chamber of the press with baling material, some parts of the illustration having been broken away and shown in section to clarify certain details of construction therein.

Fig. 1 shows a general view of the press and diagrammatically illustrates a conventional baler having the compression chamber 1 within which the reciprocable plunger 2 operates to compress hay or other material that is being supplied to the chamber 1. Plunger 2 is usually actuated through a power drive that connects with a suitable gear mechanism illustrated at 3 adapted for driving a main gear 4 which spans and meshes with the dual gears 5 and 6 having a crank pin 7 connected therebetween and common thereto for operating the pitman 8 connected with the pin 9 which is carried by the plunger 2. This particular structure is substantially the same as that shown and described in my copending application hereinbefore referred to.

The feed mechanism is generally indicated and best shown in Fig. 1 and comprises a lateral auxiliary chamber 10 having a reciprocable feed plunger 11 operating therein, this chamber 10 being flanked by a rotatably mounted fork 12. The fork 12 is mounted for operation upon a platform 13 forming a material supply zone, and such platform 13 is contiguous with the bottom 14 of the auxiliary feed chamber 10.

A conventional pick-up 15 driven in any suitable fashion is located at the forward end of the baler feed mechanism and engages materials on the ground and moves the same upon the slotted intake end 16 of the platform 13 to be there engaged by the fork 12 and moved into the auxiliary feed chamber 14 to be actuated by the piston 11 therein into the main chamber 1 of the baling press.

Although not shown, it is obvious that the entire feed mechanism may be wheel supported or suitably connected and trussed with the main portion of the baler frame in any desirable manner.

The plunger 11 may be actuated by various types of mechanism, but a preferred construction is illustrated in Figs. 3 and 4 for actuating such plunger. Plunger 11 is provided with a depending bracket 17 that extends through the slot 18 in the bottom 14 of the chamber 10 and provides a wheel bracket for carrying the pairs of wheels 19 and 20, 21 and 22, which ride upon suitable tracks 23 and 24 secured to the bottom of the auxiliary feed chamber of the press.

A chain 25 is connected at the opposite ends of the wheel bracket 17 to ears 26 and 27 and extends between the sprockets 28 and 29 pivotally carried on shafts 30 and 31, respectively. A gear 32 meshes with a pinion 33 that is rotatably carried upon a shaft 34 and a sprocket 35 is secured to the shaft 34 to drive the latter.

Figure 2:
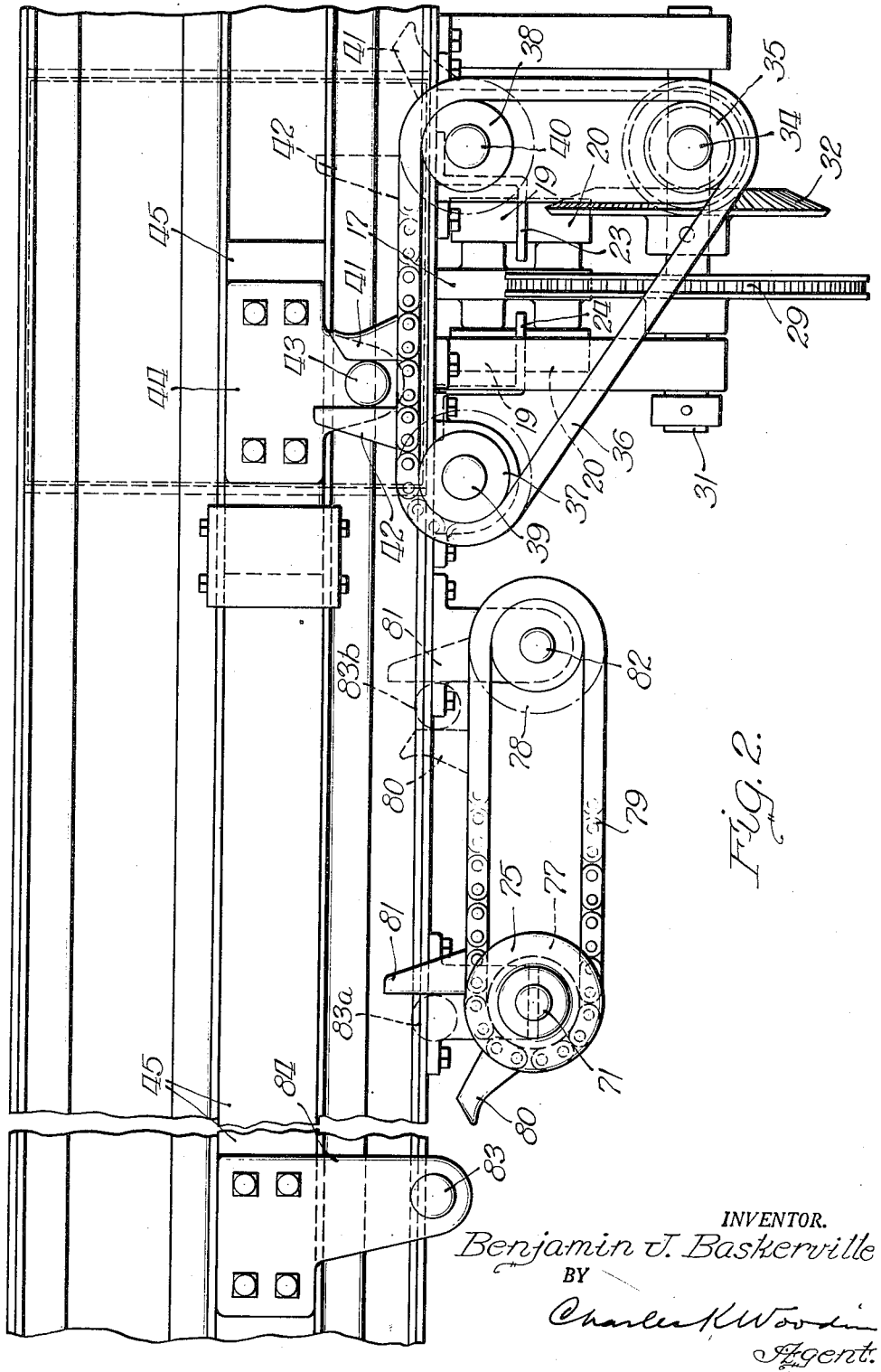
Fig. 2 is a fragmentary side elevational view of the baler illustrated in Fig. 1, showing the main actuating mechanisms for operating the feed means.

Referring now to Figs. 2 and 3, a sprocket chain 36 is connected with the sprocket 35 and passes over sprockets 37 and 38 pivotally carried upon the shafts 39 and 40 supported by suitable bearings connected with the underside of the main baling chamber framework.

Chain 36 carries a pair of spaced lugs 41 and 42 having cooperative engagement with a pin 43 supported upon a bracket 44 that is connected with a slidable bar 45 mounted for longitudinal movement upon the side of the main baling chamber.

As seen in Fig. 1, bar 45 extends toward the forward portion of the baler and is connected to the boss 46 of the bracket 47 forming part of the plunger 2, whereby the plunger and bar 45 move together during the actuation of the plunger.

As seen in Fig. 2, pin 43 is shown in its retracted position which corresponds with the retracted dead center position of the plunger 2 shown as illustrated in Fig. 1. It should also be noted that the plunger 11 is disposed in its forward material compression and feeding position shown in Fig. 1 whenever the main plunger 2 is so retracted. Forward movement of the plunger 2 corresponding to the compression stroke thereof, will now move bar 45 and cause pin 43 to move the chain 36 by engagement with the lug 41 making the plunger 11 move outwardly and away from the main compression chamber 1 through the instrumentality of the gears 33 and 32 which now drive the chain 25 in a direction to so retract the feed plunger 11. Motion of the plunger 11 is stopped in its completely retracted position as gauged by the length of the upper run of the chain 36 which permits the lug 41 to circumferentially swing about sprocket 38 into the broken line position illustrated at the right hand portion of the figure, permitting the pin 43 to pass out of operative driving contact of the operative compression stroke of the main with the lug and continue on until the full length plunger has been reached.

Referring to Figs. 1 and 5, the cooperative material feed means is the fork unit 12 which comprises a rotary framework 50 pivotally mounted upon a vertical drive shaft 51, such framework having arms 52, 53 and 54 at the upper portion of the bracket and corresponding arms 55 and 57 on the lower portion thereof, the third lower arm not being visible in Figs. 1 and 5. Each pair of vertically aligned arms support a pivotally connected shaft 58 having tines 59. The tines 59 together with each common shaft therefor are normally maintained in radially extended positions as shown in Fig. 1 for operating over and above the platform 13 and for sweeping material into the auxiliary chamber 10 to fill such chamber.

The normal radial positions of the tines are maintained by means of springs 60 connected and tensioned between the arms of the bracket 50 and the individual vertically disposed shafts 58. Pairs of coacting pins 61 and 62 are carried by the shafts 58 and arms of the bracket 50 to normally position the tines of the fork radially outwardly as shown in Fig. 1.

As seen in Figs. 1 and 5, the platform 13 is provided with upstanding guards 65 and 66, which form a pathway for guiding the materials into the opening 67 of chamber 10 as best illustrated in Figs. 1 and 3.

The guard 66 is provided with longitudinal openings 68, 69 and 70, shown in Figs. 3 and 5, to provide slots through which the tines 59 of the fork unit may operate in conveying the material to be baled into the chamber 10 through the opening 67 therein.

Any suitable drive mechanism may be incorporated for rotating the fork 12, and as shown in Fig. 5, a preferred construction includes a horizontally disposed drive shaft 71 connected by means of gears 72 and 73 to the vertical shaft 51, the latter having driving connection with the bracket 50. A shock proof or soft connection 74 is interposed between the gear 72 and the shaft 71 to overcome the starting inertia of the fork wheel 12 and to cushion the operation between the drive and the wheel in general. Similar means can also be embodied in the actuating mechanism of the plunger 11 if desired.

As best seen in Figs. 2, 5 and 6, the shaft 71 is connected to a ratchet unit 75 which cooperates with a ratchet wheel 76 secured to and forming a part of the sprocket wheel 77. The sprocket wheel 77 is loosely supported upon the shaft 71 and the latter is carried upon the underside of the baler framework by suitable bearing means. The ratchet mechanism is better understood by referring to Fig. 6 wherein the dog-carrying ratchet housing is shown keyed to shaft 71, with the dogs being progressively spaced circumferentially to engage the teeth of the ratchet 76 of the sprocket wheel 77 without lost motion between these mechanisms.

In Fig. 2, it is seen that sprocket 77 is chain connected with a sprocket 78 by means of the chain 79 carrying the lugs 80 and 81 that are identical with those illustrated at 41 and 42, except that the former operate and are arranged in reverse positions.

Sprocket wheel 78 is pivotally supported upon shaft 82 supported from suitable bearings from the underside of the baler frame. An actuating pin 83 is carried upon a bracket 84 that is also suitably connected with the slide bar 45 that connects with the bracket 47 of the plunger 2 for reciprocal motion directly with the plunger simultaneously with and in the same manner as pin 43 hereinbefore described. Several positions 83a and 83b are indicated to show how the pin 83 engages lug 81 to move the entire chain 79 into the position depicted by the reference numeral 83b thereby rotating shaft 71 a predetermined amount through the ratchet mechanism 75 to obtain a transmitted movement of one revolution through the gears 72 and 73. This one revolution is timed to return the fork wheel into the position indicated in Fig. 1 wherein one set of tines has engaged an abutment 85 forming a portion of the side wall of the auxiliary chamber 10 and one edge of the opening 67 into such chamber. Thus, the tine structure and the connected arms are revolved so that the tines clear the chamber 10 with the tines connected with the arms 54 and 57 just at the point of approaching and entering the opening 67 into the chamber 10 and with the tines of arms 52 and 55 retracted therefrom. This permits freedom of movement of the plunger 11 in synchronism with the fork wheel, and both of the feed units are definitely synchronized with the reciprocable motion of the plunger 2 through the two actuating mechanisms just described as controlled by the pins 43 and 83 as the latter reciprocate together with the actuating bar 45 and directly in unison with the reciprocating plunger 2.

It is also obvious that when the fork wheel 12 is rotated and the plunger chamber 10 is substantially filled with baling material, that the tines may reverse in action to glide over the excess or partially compacted material without causing breakage of any of the fork wheel parts. Furthermore, as shown in Fig. 7, it is to be noted that the tines are arranged and shaped to coact with the abutment 85 so as to cause very little back whip motion within the material piled up within the chamber 10 and that such tines are practically retracted endwise out of the chamber in the manner indicated in the broken line positions shown in Fig. 7. Also, an auxiliary guide wall 86 has been used to hold the tines 59 in their reversed spring stressed positions through the action of the springs 60 until the bracket 50 has rotated into a position wherein the tines may quickly rotate clockwise as viewed in Fig. 1 into a material engaging and conveying position extending through the slots in the guard wall 66, and into their normal radially outward positions. The quick clockwise rotation of the tines at the point of release from the guide wall 86 swings the tines directly into the material deposited upon the feed end of the platform 13 to move such material toward the chamber 10.

Changes in the exact construction, form, arrangement or combination of parts are contemplated as well as the use of equivalent mechanisms in a baler of this invention. The scope of such modifications shall be determined by the language of the appended claims directed to the instant baler.

What I claim is:

1. The combination with a baler having a compression chamber and a reciprocable plunger operating therein, of material feed mechanism having connection with said compression chamber comprising a pair of coacting feed units, one unit for moving the material from a supply area into the other of said units, and said other unit having communication with said compression chamber, and synchronized cooperating mechanisms connected with said reciprocable plunger and said units respectively whereby said latter plunger actuates said units, said synchronized cooperating mechanisms including reciprocable elements fixed to the plunger to move directly therewith, and further elements connected with each of said feed units for active operative contact by said reciprocable elements.

2. A baler material feed mechanism in combination with the baler compression chamber and a reciprocable plunger therefor, comprising a receiving platform, a rotatable fork for moving said material over said platform, a feed chamber connected with said platform to receive material therefrom, a feed plunger in said feed chamber, and actuating means connected with said fork and with said feed plunger to operate the same, said reciprocable plunger of said baler having operative means thereon to engage said actuating means to operate said fork and said feed plunger at predetermined intervals.

3. A baler material feed mechanism in combination with the baler compression chamber and a reciprocable plunger therefor, comprising a material receiving platform, a rotatable fork for moving said material over said platform, a feed chamber connected with said platform to receive material therefrom and communicating with said baler compression chamber, a feed plunger in said feed chamber, and actuating means connected with said fork and with said feed plunger respectively to operate each thereof, said reciprocable plunger of said baler having abutment means thereon to directly engage said actuating means to operate said fork and said feed plunger at predetermined intervals.

4. Baler feed mechanism for supplying material to a compression chamber having a reciprocably operated plunger, comprising a platform to receive said material, a rotary fork on said platform, a material feed chamber to receive said material from said platform, said feed chamber being contiguous with said platform, a feed plunger in said feed chamber to move material to the compression chamber, said fork having tines arranged to sweep over said platform and into said feed chamber, and synchronized operative means for actuating said fork and said feed plunger respectively arranged to stop said fork with the tines out of said feed chamber while said feed plunger is actuated.

5. Baler feed mechanism for supplying material to a compression chamber having a reciprocably operated plunger, comprising a platform to receive said material, a rotary fork on said platform, a material feed chamber to receive said material from said platform, said feed chamber being contiguous with said platform, a feed plunger in said feed chamber to move material to the compression chamber, said fork having tines arranged to sweep over said platform and into said feed chamber, operative means for actuating said fork and said feed plunger respectively arranged to stop said fork with the tines out of said feed chamber while said feed plunger is actuated, and coacting mechanism connected to move with said reciprocable plunger of the baler and arranged to engage and actuate said operative means for moving said fork and feed plunger in synchronized relationship.

BENJAMIN J. BASKERVILLE.

REFERENCES CITED

The following references are of record in the file of this patent:

UNITED STATES PATENTS

| Number | Name | Date |
| --- | --- | --- |
| 559,303 | Miller et al. | Apr. 28, 1896 |
| 2,355,645 | Haase | Aug. 15, 1944 |
| 2,362,861 | Russell | Nov. 14, 1944 |
| 2,405,688 | Crumb | Aug. 13, 1946 |